Nov. 18, 1958

R. HERR

METHOD AND APPARATUS FOR THE SELECTIVE ERASURE OF UNDESIRED TRANSFERRED SIGNALS IN MAGNETIC RECORDING

Filed Aug. 1, 1949

2,861,133

Inventor
Robert Herr
By
Carpenter, Abbott, Coulter & Kinney
Attorneys

United States Patent Office 2,861,133

Patented Nov. 18, 1958

2,861,133

METHOD AND APPARATUS FOR THE SELECTIVE ERASURE OF UNDESIRED TRANSFERRED SIGNALS IN MAGNETIC RECORDING

Robert Herr, St. Paul, Minn., assignor to Minnesota Mining & Manufacturing Company, St. Paul, Minn., a corporation of Delaware Application August 1, 1949, Serial No. 108,026

23 Claims. (Cl. 179—100.2)

This invention relates to magnetic recording and reproducing devices and more particularly to the substantial reduction of undesired signals occurring by reason of the transfer of such signals from adjacent layers of a magnetically recorded medium.

When magnetic wire or tape, upon which signals have been magnetically recorded, is wound on a reel, each layer of tape or wire is subjected to a magnetic field of the adjacent layers. A weak signal may thus be recorded on the adjacent layers of the wire or tape where it is not desired. The effect is particularly noticeable on magnetic wire, which does not have a backing of non-magnetic material interposed between the adjacent layers as in the case of coated magnetic tape in which ferromagnetic particles are coated on a paper or film backing. However, the effect is noticeable in many types of magnetic recording tape, particularly in recordings of programs in which a high signal to nose ratio is obtained, and more particularly if the recorded tape roll is stored for an extended period of time, or if it is stored for even a short time at temperatures above normal room temperatures.

The principal object of this invention is the substantial lessening of undesired signals transferred from layer-to-layer in rolls of recorded magnetic tape or wire. I have discovered that such signals may be partially erased without erasing the desired, recorded material. The latter effect is particularly important and is surprising since it would normally seem that the desired signal would be reduced to the same extent that the undesired signal is lowered.

The invention may be employed in conventional magnetic tape or wire recording and reproducing devices by simple modification of such devices which does not require reconstruction thereof. The transfer of signals from layer-to-layer on coated magnetic recording tapes can be substantially eliminated particularly in the higher frequencies, by thickening the non-magnetic backing from the conventional thickness of .0015 inch to a thickness of approximately .01 inch. This expedient is undesirable as a practical matter since it reduces the amount of recorded material which can be wound on the standard reels employed in recording devices. By the use of my improvement it is not necessary to increase the thickness of the non-magnetic backing in order to eliminate substantially layer-to-layer transfer of undesired signals. In my process the transferred signals are preferably removed immediately prior to play-back.

My invention, together with further objects and advantages thereof, may be fully understood by reference to the following description in connection with the accompanying drawings, in which.

Figure 1:
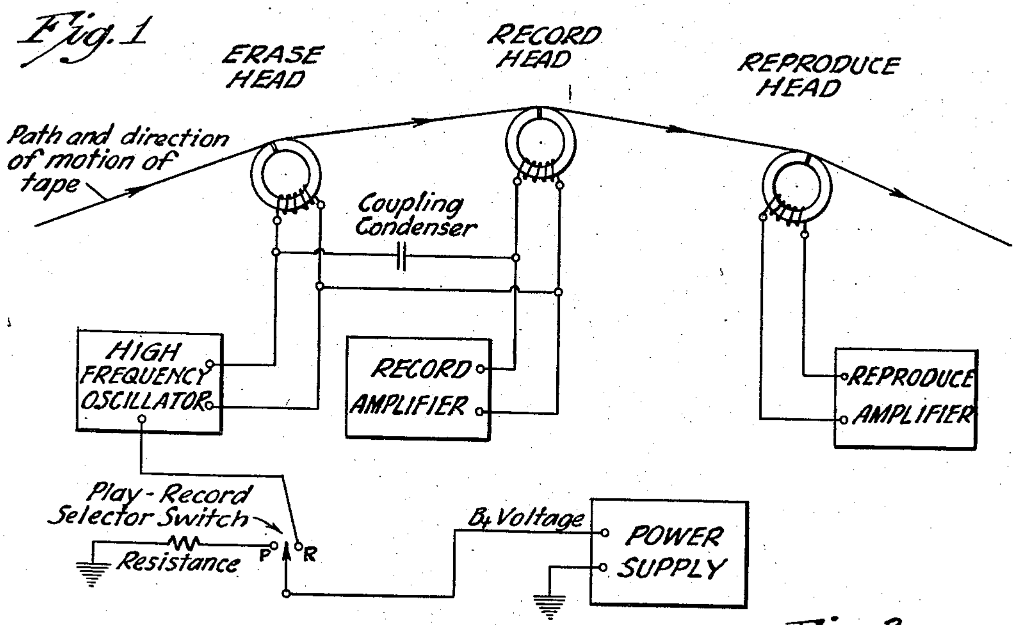
Figure 1 is a schematic wiring diagram of a conventional magnetic recording and reproducing device.

Before discussing the apparatus shown in the drawing, the nature and characteristics of transferred magnetic signals will be more fully described. When a recorded magnetic tape or wire is wound upon itself on a reel, each section of the tape or wire is in the magnetic field of the recorded portion of the adjacent layer. It is characteristic of ferromagnetic materials that under these conditions, each layer is somewhat magnetized by this field. The effect of the transferred signals is usually quite small in coated magnetic tape in which the non-magnetic backing is interposed between the adjacent layers, and it may only appear as a slight increase in the background noise level. This is demonstrated by the fact that the transfer is greater when the tapes are laid magnetic surface to magnetic surface than when the tapes are laid face to back. However, in programs having a high signal level and under certain storage conditions, particularly at high temperatures, the effect of the transferred signal may be enhanced to annoying proportions. An additional common cause of series layer-to-layer transfer is the presence of stray alternating magnetic fields.

Layer-to-layer transfer is dependent upon the signal level of the recorded signal. The magnetization curve of recording material is highly non-linear, and in the range of the small fields encountered from adjacent layers it is concave upwardly. For this reason the transferred signal level is not proportional to the recorded level but more closely approximates the square or cube of the recorded level. Thus for an increase of one decibel in record level, an increase of two to three decibels in transfer level may frequently be found. This relationship is only approximate and may vary with different types of magnetic wire and tape. However, the effect of greater transfer at higher signal levels has led to the practice of avoiding high recording levels. The application of my invention will eliminate the need of recording at lower signal levels.

Another characteristic of layer-to-layer transfer that I have noted is its dependence upon frequency, which is more accurately a wave length effect. I have found that the layer-to-layer transfer is predominantly a transfer of the low middle frequencies, such as 400 to 1000 cycles at a speed of 7.5 inches per second. At higher speeds the transfer is predominantly at proportionally higher frequencies.

A further characteristic of layer-to-layer transfer that I have encountered in attempting to measure it, is that the amount of signal transfer depends upon the length of time that the roll is stored after recording. For example, a reel on which a loud note is recorded intermittently may have only a faint suggestion of an echo on the layers contiguous to the recorded layer in play-back immediately following recording, while the same roll may show a greatly increased effect, detectable even three or four layers removed from the recorded layer, after it has been stored a long time.

It is also known that the transfer level depends upon the temperature at which the reel is stored. For a given storage time the transfer is greater at higher temperatures. The article by S. W. Johnson in the June 1949 issue of the Journal of the Society of Motion Picture Engineers, entitled "Factors Affecting Spurious Printing in Magnetic Tapes," points out that for most of the presently available magnetic recording tapes the transferred signal averages about four decibels above noise at room temperatures and that the transferred signal rises to about 10 decibels when the tape is stored at 150° F.

Another strange characteristic of signals transferred from one layer to another layer of a recorded medium is that the strength of the transferred signal is dependent upon the amount of time that elapses between the unwinding of the recorded roll and the measuring of the transfer. If the amount of transfer is measured minutes or hours after the roll is unwound, the level of the transferred signal is considerably less than the level upon immediate play-back. This fact is contrary to the experience with recorded signals in which such deterioration does not occur.

I have found that transferred signals may be erased selectively by a weak erasing field without erasing the recorded material. For example, on a standard magnetic tape upon which a 1000 cycle per second signal was recorded at a speed of 7.5 inches per second, I was able to decrease the transfer level by 7 to 8 decibels without significant (less than .5 decibel) erasure of the recorded signal. If a slightly higher erase field is employed, I am able to reduce the transfer by 10 to 12 decibels, and at the same time the recording is only erased to the extent of about 1 decibel. While these results do not constitute a complete elimination of layer-to-layer transfer, the unreduced effect is so small that further reduction of it by 5 to 10 decibels will usually make it completely undetectable.

The explanation of this selective phenomenon whereby the transferred signals are materially reduced with but little effect upon the recorded signals is not simple. I believe, although it would be difficult to prove conclusively, that it is due to the fact that a signal transferred from layer-to-layer in a roll of recorded tape or wire is effectively recorded without benefit of any bias. It has long been known that to obtain good reproduction from magnetic media it is necessary to add to the audio current in the recording head a certain amount of high frequency bias current. It is my belief that a transferred signal, recorded without any bias current, is easier to erase than one which has been recorded with the usual bias current. I have found that the ease of erasure of a recording on any given tape or wire depends on the value of the A. C. bias current used in recording and that recordings made with a low value of bias current are easier to erase than recordings made with a higher value of bias current. The amount of erasure of a signal is not a linear function of the erasing current. I believe that the erasing current includes a region of small currents which have little or no effect on the recorded signal. In this range of small currents, values probably exist which have no detectable effect on recorded signals but which cause significant erasure of transferred signals.

An advantage of my invention is that it is extremely easy to apply to conventional recording-reproducing devices and is also extremely practical in that it may be employed by merely providing a very weak current in the erase head during play-back. In the present conventional magnetic recorders and reproducers, neither erase current nor bias current is supplied on play-back. In order to substantially lessen layer-to-layer transfer, I have modified such devices to supply, in reduced amounts, either erase current or bias current, or both, during play-back. The invention may be employed with any of the well-known types of erase and record heads except those employing D. C. erasure and bias. All of the conventional recording and reproducing devices employ an on-off switch for the high-frequency supply. To practice my invention in such devices this switch need only be changed to an "on full—on partially" switch.

Figures 2, 3:
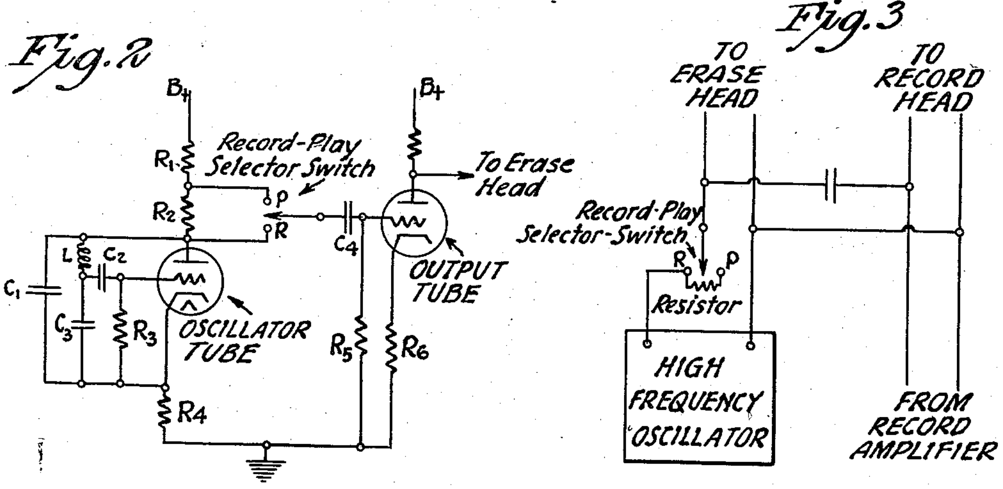
Figure 2 is a schematic wiring diagram showing a portion of a conventional circuit modified to incorporate my invention.
Figure 3 is a schematic wiring diagram of a portion of a conventional magnetic recording and reproducing circuit modified, in accordance with my invention, in a different respect from the modification shown in Figure 2.

A typical circuit employing a conventional play-record selector switch is partially shown in a simplified form in Fig. 1. Many parts of the recording device, such as the microphone, loud speaker, etc., are omitted for the reason that the instant invention is particularly centered in the recording and reproducing circuits. In Fig. 2 is shown an incomplete, simplified circuit diagram in which the oscillator is operated at all times, but at a reduced level on play-back. In this circuit the switch is in the oscillator and the output tube is not self-excited. The values of $R_1$ and $R_2$ are such that the grid signal of the output tube is in play-back merely a fraction, such as approximately one-tenth, of the signal used to drive it for erasing during the recording step.

In the modification of Fig. 3, the switch is employed in the output tube to the erase head. The value of the resistor R is such that a fraction, approproximately one-tenth, of the current normally supplied to the erase head during the recording step is supplied to the erase head during play-back; thus R may have about nine times the impedance of the heads in parallel.

Thus the desired attenuation may be obtained by a series resistor or by a variety of shunt or series impedances, or the entire switching may be done at some prior point in the oscillator supply. However, the form of switching is not material and it is to be understood that the important feature is the introduction of a weak erasing current in play-back.

In devices employing a single head for both recording and reproduction, the erasure of the transferred signals must be performed entirely by the erase head operated at a lower than normal current. In devices having separate recording and reproducing heads, the partial erasure may be performed on either the erase head or the recording head, or both, at suitably reduced currents, during play-back.

Figures 4, 5:
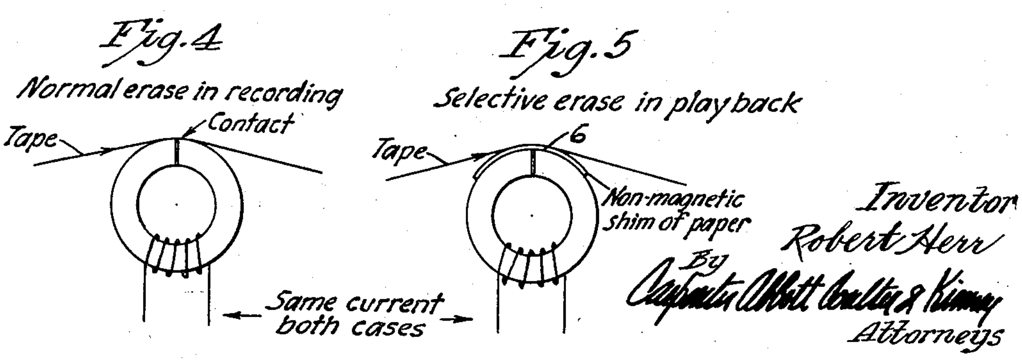
Figure 4 is a front elevational view of a conventional erase head.
Figure 5 is a front elevational view of a conventional erase head modified to include another embodiment of my invention.

Another alternative, embodying a mechanical change in conventional recording devices, is shown in Fig. 5. In this embodiment the erase head (or the recording head or both in apparatus having separate record and play-back heads) is energized fully during play-back. The magnetic tape or wire is spaced during play-back, from the record or erase head, as by a suitable non-magnetic shim 6, in such manner that the recorded medium actually encounters only a weak erasing field. The shim 6 may be formed of paper or other non-magnetic material. Its thickness may vary from 5 to 50 mils, depending upon the gap length in the erase or record head. This embodiment involves less switching than in present conventional machines, since the high-frequency current is "on" in both recording and reproducing. However, it is necessary to remove the shim 6 during the recording step in order that the magnetic tape or wire may pass through the area of the full strength of the erase field.

The degree of erasure of transferred signals by the use of different erase currents, without materially affecting the strength of the recorded signal, is illustrated in the following table. In these experiments every sixth layer of a roll of magnetic tape was recorded at a high level with 1000 cycles per second at a speed of 7½ inches per second with an audio current of .3 ma. in a No. BK919 recording head having 1800 turns, manufactured by the Brush Development Co. and with a bias current of .08 ampere through a supplementary bias winding of 50 turns. The bias current was on continuously but the audio current was only on while recording every sixth layer. The recording tape employed had a plastic backing and was coated with red, gamma $Fe_2O_3$ particles. The signal levels are set forth in the following table in decibels with arbitrary zero. The readings were taken using a 1000 c. p. s. bandpass filter to decrease the noise level to about 13 db on the scale chosen. The strength of the recorded signal is expressed in the middle column and the columns on either side of it set forth the strength of the transferred signal for the different values of partial erase current and under different storage conditions.

A. AFTER 15 MIN. STORAGE AT 25° C. WITH NORMAL PLAY-BACK (NO ERASE CURRENT)

| 2 layers outside | 1 layer outside | Recorded Layer | 1 layer inside | 2 layers inside |
|---|---|---|---|---|
| 15.5 | 30 | 88 | 25.5 | 13.5 |
| with .15 amp. erase current | | | | |
| less than 13 | 22 | 88 | 19 | less than 13 |
| with .25 amp. erase current | | | | |
| less than 13 | 18 | 86.5 | 16 | less than 13 |
| B. AFTER 4.5 HR. STORAGE AT 65° C. WITH NORMAL PLAY-BACK (NO ERASE CURRENT) | | | | |
| 21 | 38.5 | 87 | 32.3 | 18 |
| with .15 amp. erase current | | | | |
| less than 13 | 32 | 87 | 25 | less than 13 |
| with .20 amp. erase current | | | | |
| less than 13 | 26 | 85.5 | 22.5 | less than 13 |
| with .25 amp. erase current | | | | |
| less than 13 | 22 | 83 | 18 | less than 13 |

Thus it will be seen that with an erase current of .15 ampere a reduction of the transferred signal to the extent of approximately 7 decibels is obtained in the layer adjacent to the recording, while at the same time the recorded signal is not erased to a measurable extent. With slightly larger (.2 to .25 amp.) erase currents the transfer may be reduced by 10 to 12 db while the recording is erased by only about 1.5 db. With the erase head used a normal full erase current would be any in excess of 1.5 amperes. Since the occurrence of layer-to-layer signal transfer is usually below the noise level unless the roll has been subjected to high temperatures or other idealizing fields after recording, reduction of such signal in the amount of 7 decibels substantially eliminates the possibility of a noticeable echo from transferred signals.

It is believed that a field of 1000 to 2000 oersteds is required in the immediate vicinity of the recording tape in order to erase effectively signals recorded on such tape. The strength of such field will vary somewhat with different types of recording tapes (some of the present commercial brands are more difficult to erase than others) and with the strength of the bias field employed in recording the signals. I have found that signals, transferred from layer-to-layer on the recorded tape when it is wound on a reel, may be selectively erased to a satisfactory extent by passing the tape, prior to play-back, through a magnetic field of from 50 to 200 oersteds. This value will vary with the different types of recording tape and with the storage conditions. With most of the present brands of magnetic recording tape, a field of 75–150 oersteds is sufficient to erase selectively the signals transferred while the tape is on the reel. An excessive amount of erasure of the recorded signals will usually take place if the field is much stronger than 200 oersteds. For example, on a No. PT6A magnetic tape recording and reproducing device manufactured by Magnecord Inc. of Chicago, Illinois, and sold under the brand name, "Magnecorder," satisfactory removal of transferred signals was obtained with an erase current of 0.10 ampere at a tape speed of 7½ inches per second. The full erase current of this device was measured as 0.52 ampere. On a No. BK401 magnetic tape recording and reproducing device manufactured by the Brush Development Company of Cleveland, Ohio, and equipped with a BK915 erase head, an erase voltage of 4 to 5 volts on each half of the winding of the erase head was found to be sufficient to erase selectively transferred signals. The normal erase voltage was measured as 50 volts on each half of the winding.

In general the improvement may be gainfully employed in magnetic recording devices in which magnetic media are employed upon which signals have been transferred without bias from recorded signals made with bias. Thus the invention may also be employed in respect to magnetically recorded discs or cylinders in usages where the recorded members are laid in face-to-face contact with each other.

What I claim is:

1. In a magnetic recording and reproducing device for recording signals by magnetizing a magnetic record member, a record head, an audio circuit connected to said record head, an erase head, a high-frequency circuit connected to said record head and to said erase head; manually controlled means connected to said high-frequency circuit and adapted to create a magnetic field of the order of 1000 to 2000 oersteds in proximity to said erase head in order to erase directly recorded signals from said record member as it passes through said magnetic field just prior to recording and manually controlled means to create a magnetic field of the order of 50 to 200 oersteds adjacent said erase head and through which said record member passes during play-back.

2. A magnetic recording and reproducing unit for recording and reproducing signals magnetically on an elongated ferro-magnetic record member comprising a pair of spaced reels upon which said record member may be wound and unwound, a recording head, a reproducing head, an audio circuit connected to said recording head and to said reproducing head, an erase head, a high-frequency circuit connected to said recording head and to said erase head, manually controlled means adapted to create a magnetic field of the strength of the order of 1000 to 2000 oersteds in proximity to said erase head in order to erase substantially completely signals recorded on said record member as it passes through said field just prior to recording and manually controlled means adapted to create a magnetic field of the strength of the order of 50 to 200 oersteds in proximity to said recording head and adapted to erase undesired signals transferred from adjacent convolutions of the record member while wound upon a reel, without erasing substantially the desired signals, as the record member passes through said magnetic field during play-back.

3. The method of selectively erasing signals transferred from an adjacent layer of a magnetically recorded member without materially affecting the signal recorded with bias which comprises passing said magnetic member through the magnetic field of a high-frequency current that is a small fraction of the current normally used in erasing the recorded signal.

4. The method of selectively erasing signals magnetically recorded on an elongated record member without bias and without materially affecting signals recorded with bias which comprises passing said record member through the magnetic field of a high-frequency current which is approximately 10% of the current normally required to erase signals recorded on said member with bias.

5. The method of selectively erasing signals recorded without bias on an elongated record member utilizing red gamma ferric oxide particles as the magnetic medium, and without measurably affecting signals recorded on said member with bias which comprises passing said record member through a magnetic field of the order of 75 to 150 oersteds prior to play-back.

6. The method of selectively erasing signals transferred from an adjacent layer of a magnetically recorded member which normally requires a magnetic field of from 1000 to 2000 oersteds to erase the signals recorded on said member with bias comprising the step of passing the recorded member through a magnetic field of from 50 to 200 oersteds prior to play-back.

7. In a magnetic recording device, a recording head to magnetize a travelling ferromagnetic medium, an audio circuit including a coil disposed to set up a magnetic field in said recording head, an oscillatory circuit including a pair of electrically connected coils of which one is disposed to set up a magnetic field in said recording head and the other is positioned to erase magnetically said medium in advance of said recording head and means including a switch for supplying full erasing current during recording and a small fraction of said current during play-back.

8. A magnetic recording and reproducing unit comprising an electromagnetic head through which an elongated record member passes, an audio amplifier, a high-frequency oscillator, an erasing head, means connecting said electromagnetic head to said audio amplifier, means for connecting said high-frequency oscillator to said electromagnetic head and to said erasing head when said unit is being operated as a recorder, and means including a switch for connecting said high-frequency oscillator to said electromagnetic head or to said erase head when said unit is being operated as a reproducer in order to introduce a weak erase current to one of said heads.

9. A magnetic recording and reproducing unit as specified in claim 8 in which the switch is located in said oscillator.

10. A magnetic recording and reproducing unit as specified in claim 8 in which the switch is located in the output to said heads.

11. In a magnetic recording and reproducing device for recording signals by magnetizing an elongated ferromagnetic medium, a record head, an audio circuit connected to said record head, an erase head, an oscillatory circuit including a pair of coils of which one is electrically connected to said record head and the other is electrically connected to said erase head, and means adapted to create a magnetic field of the strength of 1000 to 2000 oersteds in proximity to said erase head and through which said ferromagnetic medium passes during recording and to create a magnetic field of the strength of 50 to 200 oersteds in an area in proximity to said erase head and through which said ferromagnetic medium passes during play-back.

12. In a magnetic recording device for recording signals by magnetizing an elongated medium, a record head, an erase head, an audio circuit including a coil disposed to set up a magnetic field in said record head, an oscillatory circuit including a pair of coils of which one is disposed to set up a magnetic field in said record head and the other is disposed to set up a magnetic field in said erase head, and means for spacing the path of said elongated medium from said erase head during play-back such that said elongated medium passes through a weak portion of the magnetic field of said erase head during play-back and through a strong portion of said field during recording.

13. The method of substantially attenuating the effects of undesired signals without bias upon desired signals recorded with bias on a magnetic medium without substantially affecting the desired signals, which comprises the step by subjecting the medium carrying such undesired signals to an alternating current field of such value as to attenuate substantially the undesired superimposed effects while substantially maintaining the desired recorded signal level.

14. A method of substantially attenuating the effects of undesired signals without bias upon desired signals recorded with bias on a magnetic medium without substantially affecting the desired signals, which comprises establishing a relatively weak magnetic field of such value as to attenuate substantially the undesired signals on said medium while substantially maintaining the desired recorded signal level thereon, and passing said medium through said field.

15. The method of magnetic recording which comprises the steps of recording with bias upon a magnetic medium signals intended to be relatively permanent, recording without bias upon the medium signals intended to be of temporary value only, and thereafter subjecting the medium to a magnetic field of such value as to attenuate substantially the unbiased signals while substantially maintaining the desired recorded signal level of the permanent signals.

16. The method of recording magnetic signals on and reproducing signals from a magnetic medium which comprises the steps of establishing a bias field, moving said medium through said field and recording a first signal on said medium while pasing through said field, and recording a second signal on said medium while outside of said field, establishing a magnetic field of such value as to attenuate substantially the second signal while maintaining the first signal substantially at the desired signal level, thereafter moving said medium through said magnetic field whereby said second signal is substantially attenuated while first signal remains substantially unaffected and then reproducing said first signal.

17. A method of reproducing signals recorded magnetically with bias on a magnetic recording medium, which comprises the step of passing said medium through a magnetic field of such strength prior to reproduction such that the sound effects of spurious magnetisations on said medium are substantially attenuated while substantially maintaining the level of signals recorded with bias.

18. The method of reproducing signals magnetically recorded with bias on a carrier having also parasitic impressions thereon, comprising the steps of passing the record carrier during reproduction in a given direction along a scanning member, and subjecting the record carrier before leaving said member to a magnetic field having a strength at which said parasitic impressions are materially reduced while substantially maintaining the level of signals recorded with bias.

19. The method of reproducing signals magnetically recorded with bias on a carrier having also parasitic impressions thereon, comprising the steps of conveying the carrier during reproduction in a given direction, first subjecting the moving carrier to a magnetic field having a strength at which said parasitic impressions are materially reduced without substantially affecting signals recorded with bias, and then passing the carrier along a member to effect reproduction of said signals recorded with bias with substantially reduced interference from said parasitic impressions.

20. Apparatus for reproducing sound signals from a magnetic medium carrying both desired signals recorded with bias and effects impressed upon the medium without bias, comprising means for establishing a magnetic field of a strength sufficient to attenuate substantially said effects while substantially maintaining the level of said desired signals, and means for moving the medium through said magnetic field.

21. Apparatus for reproducing sound signals from a magnetic medium carrying both desired signals recorded with bias and effects impressed upon the medium without bias, comprising means for establishing a magnetic field of a strength sufficient to attenuate substantially said effects while maintaining the level of said desired signals, means for moving the medium through said magnetic field prior to reproduction of said desired signals, and means to establish a magnetic field of a strength sufficient to substantially reduce to inaudible all said desired signals on said magnetic medium prior to recording new signals thereon.

22. Apparatus for reproducing sound signals from a magnetic medium carrying both desired signals recorded with bias and effects impressed upon the medium without bias, comprising an electromagnetic head including an air gap, a reproducing member, means for establishing, adjacent said electromagnetic head, a magnetic field of a strength sufficient to attenuate substantially said effects while substantially maintaining the recorded signal level of said desired signals carried on said magnetic medium means for moving said magnetic medium through said magnetic field and thereafter past said reproducing member during reproduction of said desired signals, and means to establish a magnetic field of a strength sufficient to substantially reduce to inaudible all said desired signals on said magnetic medium prior to recording new signals thereon.

23. Apparatus for reproducing sound signals from a magnetic medium carrying both recording of sound desired to be reproduced and undesired signals impressed upon the medium without bias and while the recorded medium is wound upon a reel comprising an erase head, a second electromagnetic head including an air gap, a magnetic medium, means for moving said medium through the magnetic field of the erase head and thereafter across the gap of said second head, means for establishing an alternating current field adjacent said erase head of sufficient intensity to erase, during a recording step, all signals previously recorded on said medium, and means for reducing the intensity of said alternating field adjacent said erase head during playback to such a value as to attenuate substantially the undesired signals while substantially maintaining the level of the desired signals.

References Cited in the file of this patent

UNITED STATES PATENTS

| | | |
|---|---|---|
| 1,828,189 | Kiliani | Oct. 20, 1931 |
| 1,828,190 | Kiliani | Oct. 20, 1931 |
| 2,468,782 | Ross | May 3, 1949 |

FOREIGN PATENTS

| | | |
|---|---|---|
| 881,562 | France | Apr. 29, 1943 |

UNITED STATES PATENT OFFICE

CERTIFICATE OF CORRECTION

Patent No. 2,861,133 November 18, 1958

Robert Herr

It is hereby certified that error appears in the printed specification of the above numbered patent requiring correction and that the said Letters Patent should read as corrected below.

Column 1, line 32, for "nose" read -- noise --; column 7, line 66, for "by" read -- of --; column 9, line 7, after "medium" insert a comma.

Signed and sealed this 3rd day of March 1959.

(SEAL)
Attest:

KARL H. AXLINE
Attesting Officer

ROBERT C. WATSON
Commissioner of Patents